United States Patent
Nelson et al.

(10) Patent No.: US 6,263,048 B1
(45) Date of Patent: *Jul. 17, 2001

(54) TESTING OF DIGITAL SUBSCRIBER LOOPS USING MULTI-TONE POWER RATIO (MTPR) WAVEFORM

(75) Inventors: George Rodney Nelson, Merritt Island; Richard D. Roberts, Palm Bay, both of FL (US); Ronald S. Squires, Agoura Hills, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/491,438

(22) Filed: Jan. 26, 2000

Related U.S. Application Data

(63) Continuation of application No. 08/985,589, filed on Dec. 5, 1997.

(51) Int. Cl.[7] .................................................. H04M 1/24
(52) U.S. Cl. ................................ 379/27; 379/26; 379/6; 379/30
(58) Field of Search .................................. 379/27, 28, 29, 379/30, 31, 22, 6, 9, 10, 12, 23, 24, 5, 1, 3, 26, 25; 370/247, 248

(56) References Cited

U.S. PATENT DOCUMENTS

| | | | |
|---|---|---|---|
| 4,264,959 | * 4/1981 | Blaase | 379/22 |
| 4,301,536 | * 11/1981 | Favin et al. | 379/22 |
| 4,768,203 | * 8/1988 | Ingle | 379/30 |
| 4,862,492 | * 8/1989 | Zwick | 379/22 |
| 4,887,289 | * 12/1989 | Montegari et al. | 379/5 |
| 5,224,149 | * 6/1993 | Garcia | 379/5 |
| 5,712,897 | * 1/1998 | Ortel | 379/22 |
| 5,875,230 | * 8/1988 | Ganley et al. | 379/22 |
| 5,920,609 | * 7/1999 | Toumani et al. | 379/22 |
| 5,940,473 | * 8/1999 | Lee | 379/1 |

* cited by examiner

Primary Examiner—Curtis Kuntz
Assistant Examiner—Rexford Barnie
(74) Attorney, Agent, or Firm—Allen, Dyer, Doppelt, Milbrath & Gilchrist, P.A.

(57) ABSTRACT

The performance of digital subscriber loops is tested through transmission, reception and analysis of a multi-tone power ratio (MTPR) waveform, containing plural discrete tones having equal spectral spacings and notches periodically distributed among the tones. The noise floor at a missing sub-carrier spectral location is integrated and compared to signal power of an adjacent sub-carrier within the test vector waveform. From these two values, MTPR is determined for various carrier locations, so that maximum theoretical loop payload can be calculated. To generated a figure of merit (FOM) under test, a data modem is placed at each end of the loop. The FOM obtained from MTPR analysis is channel based, not equipment based, and is independent of receiver implementation. Before placing a new customer in service, the MTPR FOMs for a number of loops are compared to bit rate information in a database, which correlates MTPR with a bit rate for a specific modem. Given the terminal equipment, MTPR FOMs, and the customer's data rate, one or more cable pairs that satisfy or exceed the FOM within an available cable bundle may be selected.

17 Claims, 3 Drawing Sheets

TESTING OF DIGITAL SUBSCRIBER LOOPS USING MULTI-TONE POWER RATIO (MTPR) WAVEFORM

This is a continuation of application Ser. No. 08/985,589, filed Dec. 5, 1997 pending.

FIELD OF THE INVENTION

The present invention relates in general to communication systems, and is particularly directed to a new and improved scheme for testing and estimating the performance of digital subscriber (copper) loops through the transmission, reception and analysis of a multi-tone power ratio waveform, that contains a plurality of discrete tones having equal spectral spacings and spectral notches periodically distributed among the tones.

BACKGROUND OF THE INVENTION

The advent of the use of discrete multi-tone (DMT) modulation for digital subscriber line (DSL) modem technology applications, and its potential for mass deployment by local exchange carriers for high speed internet access, has presented telecommunication service providers with a unique challenge for testing digital subscriber (copper) loops. As diagrammatically illustrated in FIG. 11 a DSL modem 10 is intended to work over an existing copper pair 11 between a customer premises (CP) 12 and central office (CO) 14. Unlike traditional dial up modems, DSL modem signals do not pass through a PCM conversion process in the voice switch 16 of the central office equipment. Instead, the modem signal is demodulated at the central office and sent to a separate digital subscriber line access multiplexer (DSLAM) 17, which couples the digital data stream onto the network 18 for transmission to a remote site 19.

Although traditional dial-up modem performance is limited primarily by the PCM conversion process in the voice switch 16, rather than the characteristics of the copper loop 11, DSL modem performance and thus DSL service is directly dependent on the quality of the copper loop. Loop quality, in turn, is dependent on loop length, interference from sources within the cable plant and outside (radio stations, etc.), as well as bridge taps, load coils, splicing etc. It will be readily appreciated, therefore, that being able to sort cable pairs from an available bundle, based on their ability to provide a specific grade of service (data rate,) is essential to the economic deployment of DMT DSL.

As diagrammatically illustrated in FIG. 2, a DMT waveform provides multiple discrete tones (sub-carriers) 21. An illustrative example is Asymmetric Digital Subscriber Line (ADSL), having a 4.3125 KHz spacing between adjacent sub-carriers 21-i and 21-(i+1), over a spectrum from about 30 KHz to about 1.1 MHz. The effective or composite data rate of the ADSL DMT waveform is the sum of the data rate on each discrete sub-carrier. The data rate for each sub-carrier is ultimately governed by the signal-to-noise and distortion ratio (SINAD) for each 4.3125 KHz channel between 30 KHz and 1.1 MHz. Given an accurate estimate of SINAD for each sub-carrier channel, a maximum theoretical data rate or payload, that is independent of modem implementation, can be calculated for the loop.

One method to conduct loop testing would be to couple actual DMT modems to each end of the copper loop and perform a bit error rate (BER) measurement to grade the line. Unfortunately, BER measurements are directly dependent on the modem manufacture's receiver implementation. A different manufacturer may have more margin over some impairments and less over others. Thus, loop grading may be artificially skewed by the receiver implementation used in the conducting the BER test.

SUMMARY OF THE INVENTION

In accordance with the present invention, this modem-dependency skew problem customarily encountered in the course of testing a telecommunication loop (e.g., a copper twisted pair used for digital subscriber line communications) is effectively obviated by taking advantage of a methodology for testing the internal analog circuitry of DMT DSL modems, which allows measurement of SINAD of the loop at various points in the DMT spectrum (between 30 KHZ and 1.1 MHz). The waveform for the test is a DMT waveform that contains a plurality of discrete tones having equal spectral spacings between sub-carriers. In addition, spectral notches are distributed periodically among the tones, for example, at every tenth sub-carrier position. The waveform is transmitted over the loop and measurements on the received signal are conducted.

In particular, the noise floor at missing sub-carrier spectral location is integrated and compared to the signal power of an adjacent existing sub-carrier within the MTPR test vector waveform. From these two values, a power ratio, termed the multi-tone power ratio (MTPR), is determined for various carrier locations across the spectrum, so that a maximum theoretical payload for the loop under test can be calculated. The MTPR takes into account various loop parameters governing ultimate modem performance simultaneously (e.g., loop loss, noise, distortion, interference, etc.) and also provides a figure of merit (FOM) for the loop under test.

In order to generate a figure of merit (FOM) for the loop, a test device, such as a data modem, may be placed at each end of the metallic line pair. Because the figure of merit obtained from MTPR analysis is channel-based, rather than equipment-based, it is independent of receiver implementation. The MTPR waveform may be transmitted over the loop in both directions and a respective FOM for each of the upstream and downstream channels computed. Then, prior to placing a new customer in service, the MTPR FOMs for a number of loops may be compared to bit rate information in a database, which correlates MTPR with a bit rate for a specific modem. Given the terminal equipment, MTPR FOMs, and the customer's service grade (data rate), one or more cable pairs that satisfy or exceed the FOM within an available cable bundle may be selected.

Advantageously, a single technician may control the operation of the MTPR test mechanism of the present invention using a feedback mechanism from a far end test device, such as a cellular data modem. Alternatively, a test waveform may be injected from a far end site in the return stream to the near end test site. Because generation of the MTPR waveform is relatively straightforward and the waveform is easy to process by conventional digital signal processing schemes, the test sets need not process the data in real time, thereby minimizing the required hardware in the test sets.

The basic functionality of a multitone power ratio (MTPR) for testing subscriber lines is a modification of frequency division multiplexing (FDM) analog technology for testing system linearity. This test consists of a transmitting and monitoring the channel response to a waveform that consists of a large number of frequency domain impulses, uniformly spaced over the bandwidth of interest, but having the feature that, periodically, a frequency impulse is missing, thereby giving the appearance of a spectral notch in the comb spectrum of the waveform.

The frequency impulses are mutually separated by a prescribed DMT carrier spacing, and each carrier of the comb has a controlled starting phase to constrain the peak to average ratio (PAR) associated with the channel waveform due to possible subcarrier instantaneous summation. Each tone's starting phase is adjusted to establish a desired PAR and the average signal level of the test vector is adjusted for a certain backoff level below full scale. This MTPR test waveform is transmitted over the twisted copper pair and the depth of the notches in the signal at the receive end of the loop is monitored with respect to the level of their adjacent carriers. Factors that contribute to raising the floor or filling-in the received signal notches include loop loss, noise, distortion, interference, etc.

The architecture of a digital signal processor-based test unit in accordance with the present invention includes a test vector buffer memory that stores a MTPR waveform pattern that has been digitally synthesized by a supervisory microcontroller. The contents of the test vector buffer memory are converted into analog format by a high speed digital-to-analog converter (DAC) and applied to a low output impedance, line driver, which amplifies the analog tone waveform to a prescribed output level.

A summing unit is installed in the transmit signal path for injecting a pilot tone that provides a reference for clocking the data output of the unit. The line driver is coupled to the line under test by way of a fixed impedance hybrid, which provides a reference for calculating return loss.

In the return/echo path, the fixed impedance hybrid is coupled to an analog front end (AFE) that contains analog band limiting filters and programmable gain line amplifier circuitry. The analog front end is coupled to an analog-to-digital converter and to a pilot tone receiver. Whenever it overflows its full scale capacity, the analog-to-digital converter provides an overflow signal which is monitored by the microcontroller for the purpose of adjusting the programmable gain amplifier circuitry within the analog front end.

The pilot tone receiver includes a narrow bandwidth pilot tone filter, the output of which is coupled to a level detector and to a xK phase locked loop. During pilot tone acquisition, the level detector examines the signal strength of the pilot tone to estimate the cable plant frequency slope and initially set the gain parameters of the amplifiers within the analog front end. The xK phase locked loop derives a local clock to mimic the original transmission clock by phase locking techniques, using a prescribed loop multiplication factor for the pilot tone.

The output -of the analog-to-digital converter is coupled to a high speed memory buffer, which stores the output of the converter and is controlled by the microcontroller. A controlled oscillator supplies the clock drive for each of the DAC and the analog-to-digital converter, and is tuned approximately to the frequency of the pilot tone generator; a slight adjustment range provides for frequency synchronization under control of the microcontroller.

The MTPR test mechanism of the present invention operates in two primary modes: transmit mode and receive mode, with the mode being predetermined prior to commencement of testing of the digital subscriber line under test. In the transmit mode, the microcontroller initially loads the test vector buffer memory with the digitally synthesized MTPR test pattern. Once the MTPR test vector has been loaded, the DAC cycles through the test vector memory, repeatedly fetching data. The pilot tone (or a pilot tone pair) is injected into the signal path, and the composite test waveform is amplified and coupled via the fixed impedance hybrid to the line.

While in the transmit mode, the receiver circuitry of the transmitting test unit can lock onto the echo signal that leaks through the fixed impedance hybrid, as a result of line impedance mismatch with respect to the impedance of the line. Like a received MTPR waveform, the echo signal is digitized and then buffered in high speed memory buffer. It is then processed by the microcontroller, in order to accurately estimate the phase and magnitude of the line reflection coefficient over frequency. Also, the effect of the echo on received signal performance margin may be determined.

The received signal waveform is coupled from the line under test by way of fixed impedance hybrid and then amplified and band-limited to the frequency band of interest by the analog front end. The output of the analog front end is coupled over two paths, one to the pilot tone receiver and one to the analog-to-digital converter. The analog-to-digital converter digitizes the received signal and clocks it into the high speed memory buffer for storage. Once the memory buffer is full, the microcontroller downloads the data for application to the MTPR testing mechanism.

The MTPR testing mechanism of the invention employs four sequential steps: pilot clock acquisition, MTPR waveform acquisition, filter band analysis and post processing. During pilot clock acquisition, one or a pair of pilot tone carriers is transmitted over the line. The received pilot tone is analyzed to estimate the cable plant frequency slope, initially set the gain parameters of the amplifiers within the analog front end, and to derive a local clock to mimic the original transmission clock by phase locking techniques, using a prescribed loop multiplication factor for the pilot tone.

Once the transmitted clock has been derived, the MTPR test vector signal is transmitted and recovered. The transmission of the full MTPR test waveform does not impact receiver clock recovery, since the receiver clock is derived by the analog tuned filtering scheme within the pilot tone recovery path. At the receiver, the MTPR test waveform is digitized, stored in memory, and then read out and coupled to an N point FFT processor, executed by the digital signal processor of the microcontroller. The N point FFT processor implements a comb filter, having respective filter elements centered on each of the RF carrier frequencies of the MTPR test vector waveform.

Since frequency synchronization with the transmitter clock has already been obtained during pilot tone acquisition, each carrier of the MTPR waveform will fall in the middle of a respective FFT frequency bin. In order to accommodate the transient response of the line under test (twisted pair channel), contiguous phase, continuous MTPR test vectors are transmitted. The contents of the buffer memory are downloaded and subjected to the FFT to recover the MTPR frequency spectrum, including those frequency bins that are centered at the periodically distributed notch locations of the test waveform. Processing of the received signal is conducted over the period of time during which the MTPR test vector is being transmitted. During post-processing, information derived from the frequency bins of the N point FFT is employed to determine the MTPR FOM, estimate line input impedance, estimate the line frequency response and impulse response.

MTPR is measured by determining the ratio of the notch depths, averaged across all the notches in the received MTPR waveform. These measurements can be averaged over a number of FFT measurements to reduce measurement noise. The frequency response of the reflected signal is estimated using the near end receiver to measure the echo.

The magnitude and phase of the frequency bin coefficients are processed in the near end receiver, and the frequency response of the echo signal is sampled. From this frequency response information, the echo impulse response is calculated, the frequency being dependent upon input line impedance and the expected return loss over the frequency band of interest.

In a manner similar to determining line impedance, the far end FFT bin complex values are used to determine the line frequency response. In addition, the impulse response of the channel is derived through inverse FFT processing. This information indicates how the line under test impacts the performance of a particular vendor's modem.

Estimation of the performance of a given product, when used with the line under test, is readily derived from a comparison of the actually measured values of a set of prescribed channel parameters (including MTPR, channel frequency response and line return loss) with corresponding operational specification values provided by a modem vendor for one or more modem products, that are stored in a product performance data base.

Prior to placing a new customer in service, the MTPR FOM for a number of loops may be compared to bit rate information in a database, which correlates MTPR with a bit rate for a specific modem. Given the terminal equipment, MTPR FOM, and the customer's service grade (data rate), the appropriate cable pair or a group of cable pairs may be selected.

DETAILED DESCRIPTION

Figure 1:
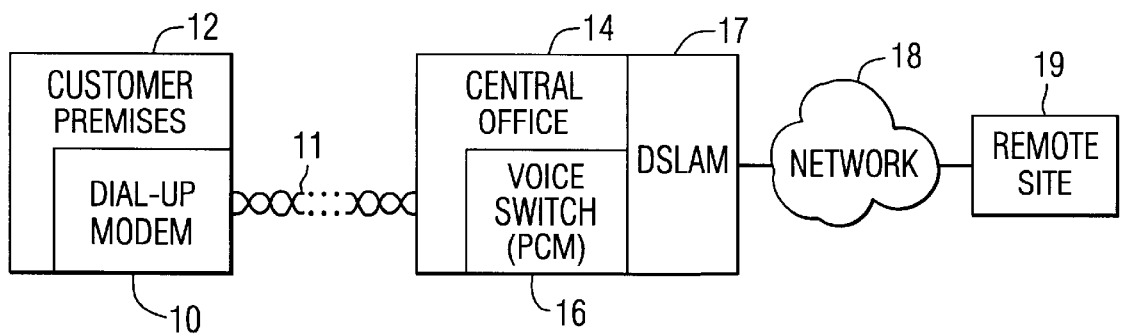
FIG. 1 diagrammatically illustrates a simplified high speed digital telecommunication network having a DSL modem coupled to an existing copper pair between a customer premises and a central office.
Figure 2:
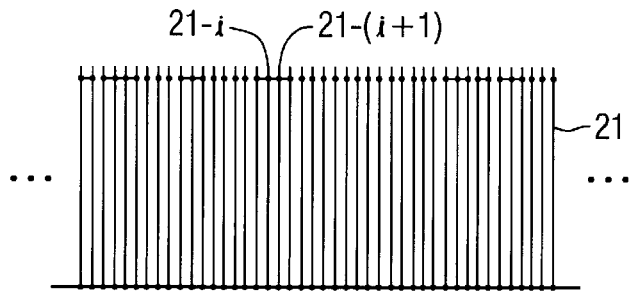
FIG. 2 diagrammatically illustrates a DMT waveform.

Before describing in detail the multi-tone power ratio-based testing methodology of the present invention, it should be observed that the invention resides primarily in what is a prescribed arrangement of conventional communication circuits and associated digital signal processing components, and an attendant supervisory control program therefor that controls the operations of such circuits and components. Consequently, the configuration of such circuits and components, and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations to be described are primarily intended to show the major components of the system in a convenient functional grouping and processing sequence, whereby the present invention may be more readily understood.

As described briefly above, the multi-tone power ratio-based testing mechanism of the present invention takes advantage of a methodology that has been employed for testing internal analog circuitry of DMT DSL modems, in order to measure the SINAD of the loop at various DMT spectral locations within the DMT bandwidth of 30 KHz to 1.1 MHZ. To facilitate an appreciation of the benefits of using MTPR waveform testing and predicting the performance of a metallic digital subscriber loop, the basic functionality of DMT signalling and MTPR testing of analog circuitry components (amplifiers) will be briefly reviewed. For a more detailed discussion, attention may be directed to Application Note No. AN9718 published by the assignee of the present application, entitled: "Analog Amplifier Linearity Characterization via Probability Weighted Multitone Power Ratio Testing (H15905)," by R. Roberts et al, April 1997, pp 1–5, and attached herewith as Appendix 1.

A fundamental aspect of DMT (discrete multi-tone) modulation is the partitioning of the available bandwidth into frequency subbands, or bins, and assigning a low baud rate modulated carrier to each bin center. Over the sub-band bandwidth, the channel looks relatively benign, and hence requires minimal equalization, which considerably simplifies implementation. Such a frequency bin approach facilitates modulation using inverse fast Fourier transform (FFT) techniques and demodulation by an FFT, which gives rise to a particular subset of DMT called OFDM (orthogonal frequency division multiplexing).

Figure 3:
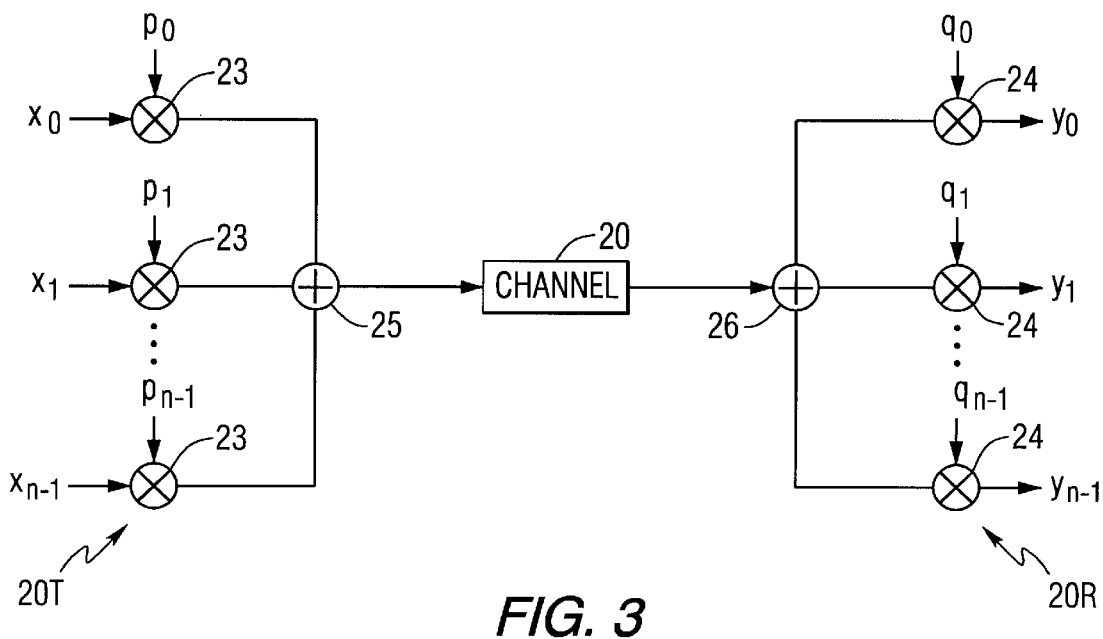
FIG. 3 is a block diagram of a DMT/OFDM communication architecture.

OFDM is essentially the conversion of a modulating data vector, representing modulation symbols for each of parallel frequency tones, into a time domain sequence of tones for transmission over a channel that is terminated in an OFDM demodulator for extraction of the data vector. FIG. 3 shows a block diagram of this basic DMT/OFDM communication architecture, where $p_i$ and $q_i$ represent respective modulating tones. At the transmit end 20T of the channel 20, respective tones $p_i$ are applied to first inputs of a set of transmission mixers 23, second inputs of which receive the data streams $x_i$ to be transmitted. The modulation signals are then summed at 25 and applied to the channel 20. At the receive end 20R of the channel 20, respective demodulation tones $q_i$ are applied to first inputs of a set of receiver mixers 24, second inputs of which receive the received data stream derived from a splitter 26. The outputs $y_i$ of the mixers 24 represent the individual data streams.

The drawback to DMT modulation is a bothersome peak to average ratio (PAR) associated with the channel waveform due to possible subcarrier instantaneous summation. For asymmetric digital subscriber loops (ADSL), which may employ as many as 256 carriers, PAR can be very large; fortunately this does not occur very often. The theoretical limit on PAR, given constant envelope signaling on each DMT carrier is $10 \log_{10}(M)$, where M represents the number of DMT carriers. Again, this worst case condition seldom happens. For the case where the number of carriers is reasonably large, the probability distribution on a per sample basis is Gaussian-distributed based on the central limited theorem. The value of the PAR can be adjusted as a parameter to determine channel dynamic "head room."

The basic functionality of a multitone power ratio (MTPR) for testing subscriber lines may be characterized as a modification of a classic technique from frequency division multiplexing (FDM) analog technology for testing system linearity. This test consists of a plethora of frequency domain impulses, uniformly spaced over a bandwidth of interest, but having the feature that, periodically, a frequency impulse is missing—giving the appearance of a spectral notch. The time series representation of this waveform for the case where every sixteenth tone is absent is set forth in Equation 1 as:

$$s(k) = \sum_{i}^{L} \cos(\Omega_i k + \phi_i) i \neq 16, 32, \text{etc.} \quad (1)$$

where L=256 for ADSL, $\Omega_i$=2πi/L and term $\Phi_i$ represents the starting phase of the $i^{th}$ tone.

Figure 4:
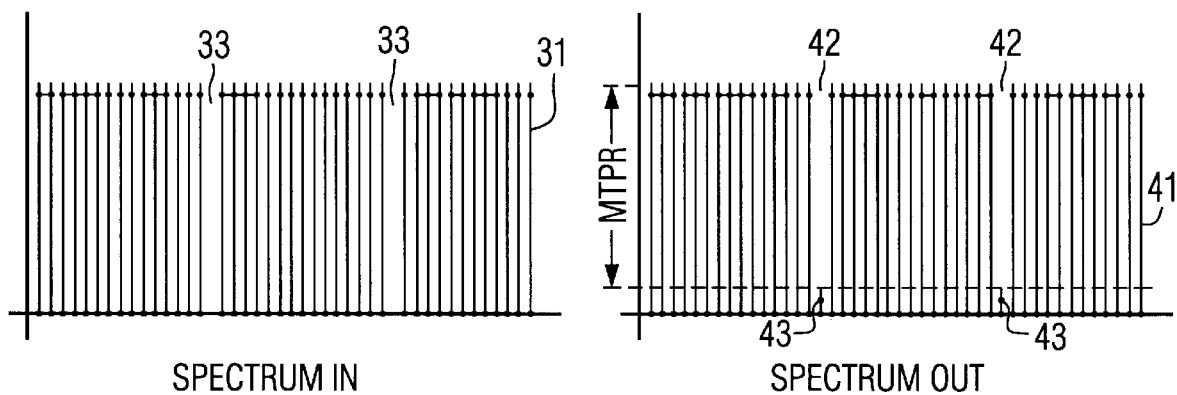
FIG. 4 shows the comb spectrum of an MTPR test vector comprised of spaced apart frequency impulses having suppressed tones located periodically in the spectrum.

The spectrum of this test vector is shown in FIG. 4 15 as a comb spectrum of frequency impulses 31 having suppressed tones located periodically in the spectrum, as shown at 'notches' 33. The frequency impulses 31 are separated by an DMT carrier spacing [x], and each carrier of the comb has a controlled starting phase $\Phi_1$ [x] to constrain the PAR. In particular, each tone's starting phase is adjusted to establish a desired PAR and the average signal level of the test vector is adjusted for a certain backoff level below full scale.

Pursuant to the MTPR test, this test waveform is transmitted over the circuit under test and observed at the receive end of the loop the depth of the notches 42 in the received signal with respect to the level of their adjacent carriers 41. Factors that contribute to filling-in the received signal notches 42, shown at 43, include loop loss, noise, distortion, interference, etc. In an DMT/OFDM spectrum, where it is important to maintain a high signal to distortion ratio in each of the frequency bins, aggregate MTPR requirements for ADSL are on the order of 65 dB (i.e. notches need to have a depth of at least 65 dB).

The MTPR waveform-based test methodology of the present invention may be efficiently performed using digital signal processing techniques. For this purpose, as diagrammatically illustrated in FIG. 5, the test vector of Equation 1, having a known PAR value, is synthesized in a digital signal processor (DSP) 51, and stored in a high speed memory buffer 53. The test vector is repeatedly read out signal via a digital-to-analog converter (DAC) 55 and coupled to the circuit/loop under test 57. The received DMT waveform is digitized in analog-to-digital converter (ADC) 61. The digitized received waveform is buffered in memory 63 and then coupled to processor 65 for analysis.

Figure 5:
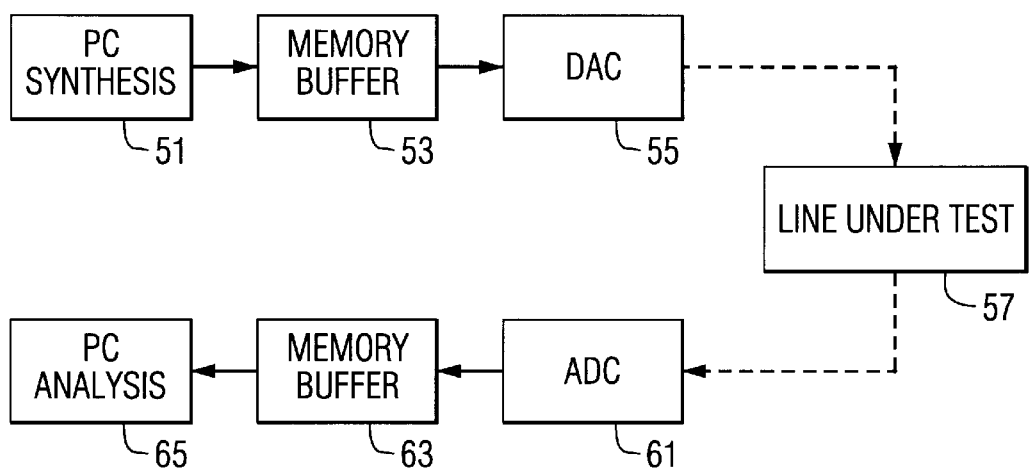
FIG. 5 is a simplified block diagram of a digital signal processor-based MTPR test architecture for testing a telecommunication line.
Figure 6:
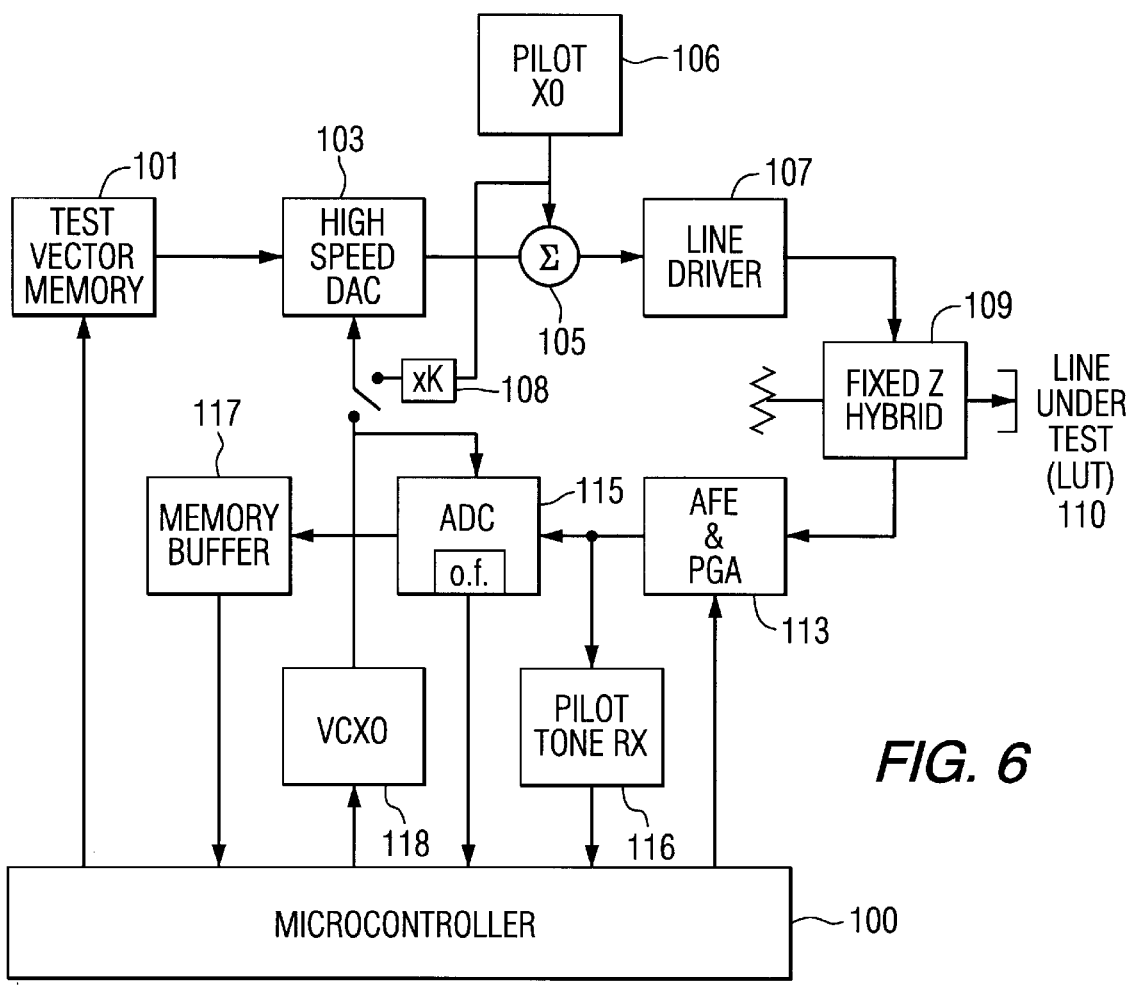
FIG. 6 diagrammatically illustrates a practical hardware implementation of the digital signal processor-based test architecture of FIG. 4.

FIG. 6 diagrammatically illustrates a practical hardware implementation of the digital signal processor-based testing architecture of FIG. 5. A test vector buffer memory 101 stores the MTPR waveform pattern supplied by a supervisory microcontroller 100, which includes a processor chip and associated RAM/ROM components. In order to avoid cluttering of the drawing control lines from microcontroller 100 to the circuit components of FIG. 6 are not explicitly shown. Microcontroller 100 provides decisions and sequencing for executing the functionality of the test architecture, as well as high speed, mathematical processing for reducing the output of the memory buffer to MTPR performance metrics, as will be described.

The test vector is repetitively read out from the buffer memory 101 and converted into analog format by way of a high speed DAC 103 for application to the line under test 110. The waveform pattern is time domain continuous and the peak-to-average ratio can be arbitrarily set within prescribed bounds. For typical ADSL testing, this capacity of the test vector memory 101 may be less than 10 K words. As a non-limiting example, high speed DAC 103 may comprise a 14 to 16 bit DAC with a sampling clock rate around 5 Msps.

The output of DAC 103 is coupled by way of a summing unit 105 to a high linearity, low output impedance, line driver 107, which serves to amplify the analog waveform to a prescribed output level. Summing unit 105 is also coupled to receive a pilot tone signal, during the transmit mode and provides the reference for clocking the data output of the unit. The pilot tone or tones may be generated by way of a pilot tone generator 106, or digitally synthesized and read out of memory 101. The pilot tone is not used when the test unit is in the receive mode. A multiply by K unit 108, containing a phase locked loop (PLL) is operative to change the frequency of the pilot tone generator 106 by a multiplication factor K, in order to establish the locking frequency for the DAC 103. As a non-limiting example, the pilot tone generator 106 may be operative to generate a base frequency of 69 KHz, which may be readily multiplied up to 276 KHz, with K=4, so that pilot tone generator may produce an output pilot tone pair of 69 KHz and 276 KHz. For ADSL, the pilot tone generator frequency may be on the order of 276 KHz, with the K multiplier 108 operative to multiply the pilot tone frequency by a factor of 16.

The output of the line driver 107 is coupled to the line under test 110 by way of a fixed impedance hybrid 109, such as a trans-hybrid type that uses a transformer and resistive network having a reference impedance on the order of 100 ohms. The fixed impedance hybrid 109 provides a reference for calculating return loss, but is not used for full-duplex transmissions, as the test architecture only operates in full-duplex mode to measure near end echo, but not to monitor a full-duplex transmission.

In the return/echo path, the fixed impedance hybrid 109 is coupled to an analog front end (AFE) 113 that contains analog band limiting filters and programmable gain line amplifier (PAL) circuitry. The output of AFE 113 is coupled to an analog-to-digital converter (ADC) 115, containing anti-aliasing filters, and to a pilot tone receiver 116, to be described in detail below with reference to FIG. 7. As in the case of DAC 103, ADC 115 may have a resolution on the order of 14 to 16 bits with a sample rate around 5 Msps. ADC 115 is operative to provide an overflow (o.f.) signal whenever it overflows its full scale capacity. The overflow signal o.f. signal is monitored by microcontroller 100 for the purpose of adjusting the PGA circuitry within AFE 113.

The pilot receiver 116 includes pilot tone filter circuitry tuned to the output frequency of the pilot tone generator 106, having a (+/−) tuning window that is a small percentage determined by the accuracy of the pilot crystal oscillator 106. The pilot tone filter is used in the receive mode to establish initial receiver timing. In addition, the PGA circuitry within AFE 113 is coarsely set based upon the pilot tone signal level.

The output of ADC 115 is coupled to a high speed memory buffer 117, which stores the output of the ADC 115 and is turned on/off under command of microcontroller 100. While the depth of buffer 117 may vary, it is typically on the order of less than one megaword. A controlled oscillator 118, which supplies the clock drive for each of DAC 103 and ADC 115 is tuned approximately to the frequency of the pilot tone generator 106, and provides a slight adjustment range to obtain frequency synchronization via commands from the microcontroller 100.

Figure 7:
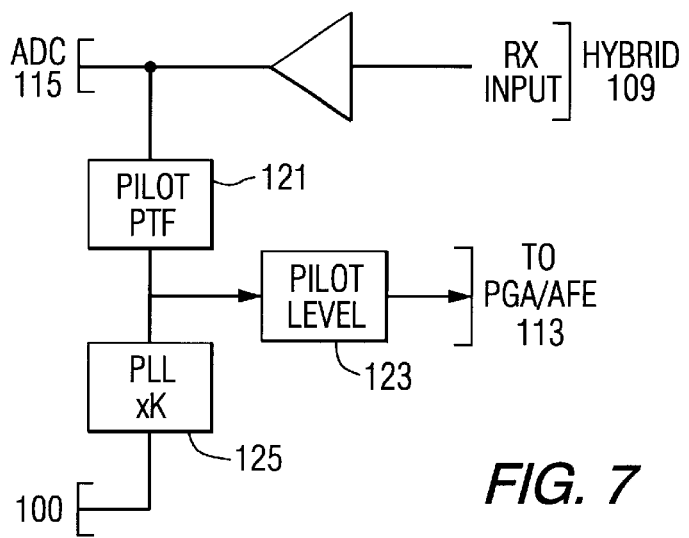
FIG. 7 shows details of the pilot tone receiver of the test architecture of FIG. 6.

The pilot tone receiver 116 contains a pair of analog based receiver pilot tone receivers, the recovery signal path for only one of which is shown in FIG. 7, in order to simplify the drawing. The pilot tone recovery signal path includes a narrow bandwidth pilot tone filter 121, the output of which is coupled to a level detector 123 and a xK phase locked loop (PLL) 125. The level detector 123 examines the signal strength of the individual pilot tone frequencies, to estimate the cable plant frequency slope and initially set the gain parameters of the PGAs within the AFE 113, as described above.

The PLL 125 is employed to reconstruct a local clock to mimic the original transmission clock by phase locking techniques, using a prescribed loop multiplication factor (e.g., 16 and 4, respectively) for the respective tones of the pilot tone pair. For the case of ADSL, the reconstructed clock will typically have a frequency of 4.4 MHz. Since all the MTPR subcarriers are fractional subharmonics of this clock frequency, DSP FFT techniques are readily executed by the processor 100 to recover the individual tones of the DMT waveform.

OPERATION

Figure 8:
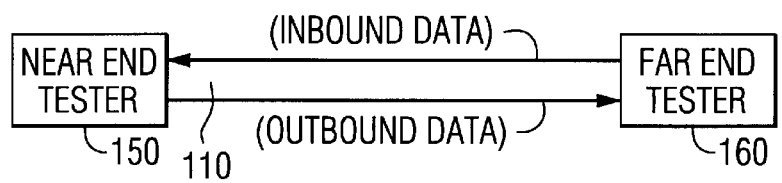
FIG. 8 diagrammatically illustrates respective test devices placed at opposite ends of a metallic line pair under test.

The test architecture of FIG. 6 operates in two primary modes: transmit mode and receive mode, with the operating mode being predetermined prior to commencement of testing of the line 110. As diagrammatically shown in FIG. 8, respective test devices 150 and 160 may be placed at opposite ends of the metallic line pair 110 under test. As a non-limiting example, such test devices may comprise a test set of the type described in U.S. patent application Ser. No. 08/855,117, filed May 13, 1997, by Roy L. Soto et al, entitled: "Test Set Using ISDN Bearer Channel for Testing Telephone Line," assigned to the assignee of the present application and the disclosure of which is herein incorporated.

Advantageously, this type of test device allows 'dry loop' testing of a link, in which battery from a public telephone network is not required. Instead, a communication link may be established over a dry loop between two test sets connected to opposite ends of a non-powered link to be tested (e.g., prequalified for customer service), with one of the test sets operating in line-termination (LT) mode. In this mode, a loopback command is issued to a downstream device from the upstream device, so that the downstream device will provide a feedback path to the upstream device, enabling a single craftsperson to perform the test methodology of the present invention.

Alternatively, a separate MTPR test waveform may be injected into the return stream (inbound data) to the near end test site, by way of the test unit located at the far end site. Since generation of the MTPR waveform is relatively straightforward and the waveform is easy to process using digital signal processing techniques, the data need not be processed in real time, thereby minimizing the required hardware in the test unit.

TRANSMIT MODE

In preparation for transmission, the microcontroller 100 loads the test vector buffer memory 101 with the digitally synthesized MTPR test pattern. The MTPR waveform contains periodic notches in the frequency domain, as described above with reference to FIG. 4, and includes a notch at the pilot tone generator frequency that is used for insertion of the pilot signal. The MTPR test pattern can either be calculated in real time or read out from low speed, high density memory.

With this MTPR test vector loaded, the DAC 103 cycles through the test vector memory 101, fetching data sequentially in a cyclic manner. The length of the data sequence is variable, and may be on the order of several hundred milliseconds, as a non-limiting example. The pilot tone is injected into the signal path by way of the summing unit 105. The line driver 107 amplifies the composite test waveform and couples it to the fixed impedance hybrid 109, which applies the signal to the line 110.

While in the transmit mode, the receiver circuitry of the transmitting test unit can lock onto the echo signal that leaks through the fixed impedance hybrid 109, as a result of line impedance mismatch with respect to an assumed line impedance. Like a received MTPR waveform (either transmitted from a far end test unit or looped back from the far end of the line under test 110), the echo signal is digitized by ADC 115 and then buffered in high speed memory buffer 117. This echo signal is processed by microcontroller 100, in order to accurately estimate the phase and magnitude of the line reflection coefficient over frequency. Also, the impact of the echo on received signal performance margin may be determined.

RECEIVE MODE

The received signal waveform is coupled from the line 110 by way of fixed impedance hybrid 109, and then amplified and band-limited to the frequency band of interest by the AFE 113. For ADSL, the bandwidth of interest has a range on the order of from 20 KHz to 1.1 MHz. The gains of the PGAs within AFE 113 are initially set at low values during the signal acquisition portion of the test mechanism (to be described). The output of the AFE 113 is coupled over two paths, one to the pilot tone receiver 116. The pilot tone filter extracts the pilot tone signal, which is used to lock the output frequency of the controlled oscillator 118 to the pilot frequency. The signal strength of the pilot signal is also used to initially set the PGA gain levels within AFE 113. These gains levels become refined in accordance with overflow performance of the ADC 115. The second signal path from AFE 113 is through ADC 115, where the analog signal is digitized and clocked into the high speed memory buffer 117 for storage. Once the memory buffer 117 is full, the microcontroller 100 downloads the data for application to the MTPR testing mechanism.

In accordance with the MTPR testing mechanism to be described below, once a steady state condition is reached, FFT processing is used to locate and measure the depth of the MTPR notches in the received waveform. The FFT processing may be averaged over several notches and signal runs. The results are then passed back to the controller which predicts a given modem vendor's performance based upon stored modem characterization data, and readies the output to a man-machine interface. The testing mechanism employs four sequential steps: pilot clock acquisition, signal acquisition, filter band analysis and post processing.

PILOT FREQUENCY SIGNAL ACQUISITION

This initial step in the testing sequence comprises transmitting a period of dual pilot tone carriers at a pair of readily definable frequencies (e.g., 69 KHz and 276 KHz). These two pilot tone signals may be generated directly by the pilot tone generator 106 and its associated K multiplier 108, or via a pattern stored in the test vector memory 101, as described above. These two pilot tones signals are detected by way of the pilot tone receiver 116.

SIGNAL ACQUISITION

Once the transmitted clock signal has been reconstructed via pilot tone acquisition, as described above, the MTPR test vector signal is transmitted and recovered. For this purpose, a straightforward time out routine is used to indicate when to stop sending only the pilot tone signal pair and begin sending the full MTPR test waveform.

As described above with reference to FIG. 4, the MTPR test waveform is made up of a plethora of frequency spikes (carriers) with periodically a missing carrier. The transmission of the full test waveform in no way impacts the receiver clock recovery mechanism, since the receiver clock is derived by means of an analog tuned filtering scheme within the pilot tone recovery path. At the receiver, the MTPR test waveform is coupled from the AFE 113 to the ADC 115, which converts the received signal to a digitized data word stream. The output of the ADC 115 is buffered in memory 117 and then read out to an N point FFT processor, that is executed by the digital signal processor within the microcontroller 100. This FFT processor implements a comb filter, having respective filter elements centered on each of the RF carrier frequencies of the MTPR waveform shown in FIG. 4.

Since frequency synchronization with the transmitter clock has already been obtained during pilot tone recovery mode, it is guaranteed that each carrier of the MTPR waveform will fall in the middle of a respective FFT frequency bin. In order to accommodate the transient response of the line under test (twisted pair channel) 110, contiguous phase, continuous MTPR test vectors are transmitted. After a relatively brief interval that allows for at least N samples loaded into the buffer memory 117, the contents of the memory 117 are downloaded and subjected to the FFT to recover the MTPR frequency spectrum, including those frequency bins that are centered at the periodically distributed notch locations of the test waveform.

In order to achieve as accurate a measurement as possible, it is preferred that the ADC 115 be driven to full resolution. However, if the signal is too strong, the ADC will clip the signal. Conversely, if the signal is too weak, the ADC will be underdriven and the quantization noise will dominate the MTPR measurement. The appropriate signal level that achieves full ADC resolution is determined by summing the signal power from the individual frequency bins at the output of the FFT. From this information, the RMS level is determined, and the PGAs within the AFE 113 are adjusted to achieve the required ADC drive level.

FILTER BAND ANALYSIS

Processing of the received signal is conducted over an extended period of time during which the transmitter is transmitting the MTPR test vector. For an N point FFT, the transmission interval employed for this purpose is determined from the following estimated link budget:

| | |
|---|---|
| Transient Response Time: | N samples |
| Signal Acquisition Time: | 2N samples |
| Data Analysis Time: | N samples/average |
| Number of Averages: | 10 |
| Padding: | 2N |
| Total: | 15N |

For ADSL, where N=512 samples at 2.2 Msps, the signal acquisition and analysis requires on the order of 7,580 samples or an interval of 3.5 millisec.—a relatively short period of time. The bulk of the analysis takes place during the averaging process—ten in the above example. This means that 10 N point FFTs are employed and the outputs of the respective frequency bins are averaged together to reduce measurement noise.

POST-PROCESSING

In the post-processing operation, information derived from the frequency bins of the N point FFT is employed to do the following: 1—determine an MTPR figure of merit (FOM); 2—estimate line input impedance; 3—estimate the line frequency response and impulse response; and 4—predict a vendor's performance based on these results.

1—MTPR is measured by determining the ratio of the notch depths, averaged across all the notches in the received MTPR waveform. In addition, as described above, these measurements can be averaged over a number of FFT measurements to reduce measurement noise, such as an average of ten, as a non-limiting example.

2—The frequency response of the reflected signal is estimated using the near end receiver to measure the echo. The magnitude and phase of the frequency bin coefficients is processed in the near end receiver, and the frequency response of the echo signal is sampled. From this frequency response information, the echo impulse response is calculated in a straightforward manner, the frequency being dependent upon input line impedance and the expected return loss over the frequency band of interest.

3—In a manner similar to determining line impedance above, the far end FFT bin complex values are used to determine the line frequency response. This is possible because the MTPR tones, in effect, sample the frequency response of the channel. In addition, the impulse response of the channel is derived through inverse FFT processing. This information is useful to determine how the line under test impacts the performance of a particular vendor's modem.

4—Estimation of the performance of a given product when used with the line under test is readily derived from a comparison of the actually measured values of a set of prescribed channel parameters (including MTPR, channel frequency response and line return loss) with corresponding operational specification values provided by a modem vendor for one or more modem products, that are stored in a product performance data base.

Prior to placing a new customer in service, the MTPR FOM for a number of loops may be compared to bit rate information in a database, which correlates MTPR with a bit rate for a specific modem. As described previously, given an identification of the customer's terminal equipment, the determined MTPR FOM, and the customer's service grade (data rate), the appropriate cable pair or a group of cable pairs may be selected.

As will be appreciated from the foregoing description, the unwanted modem-dependency skew problem conventionally encountered when testing a copper twisted pair used for digital subscriber line communications is effectively obviated in accordance with the MTPR test vector-based transmission and analysis mechanism of the present invention, which allows measurement of SINAD of the loop at various points in the DMT spectrum (between 30 KHz and 1.1 MHz). As described, the MTPR test vector waveform is a DMT waveform, that contains a plurality of discrete tones having equal spectral spacings between sub-carriers, and spectral notches are distributed periodically among the tones. The waveform is transmitted over the loop and measurements on the received signal are conducted to derive a figure of merit for the line under test. Prior to placing a new customer in service, the MTPR FOMs for a number of loops may be compared to bit rate information in a database, which correlates MTPR with a bit rate for a specific modem. Then, given an identification of the customer's terminal equipment, the determined MTPR FOM, and the customer's service grade (data rate), the appropriate cable pair or a group of cable pairs may be selected.

While we have shown and described an embodiment in accordance with the present invention, it is to be understood that the same is not limited thereto but is susceptible to numerous changes and modifications as are known to a person skilled in the art, and we therefore do not wish to be limited to the details shown and described herein, but intend to cover all such changes and modifications as are obvious to one of ordinary skill in the art.

What is claimed is:

1. A method measuring performance of a metallic wireline communication channel comprising the steps of:
 (a) transmitting a multi-tone power ratio (MTPR) waveform, including a pilot tone, over said metallic wireline communication channel;
 (b) using a reference tone signal derived from said pilot tone, detecting said MTPR waveform transmitted over said metallic wireline communication channel in step (a); and
 (c) deriving a figure of merit for at least one of impedance and frequency response of said metallic wireline communication channel by determining the MTPR based on the MTPR waveform detected in step (c) and deriving the figure of merit from the MTPR.

2. A method according to claim 1, further including step (d) determining whether said communication channel satisfies a prescribed criterion for conducting communications by way of a given communication device, in accordance with a relationship between said figure of merit and performance data associated with said given communication device.

3. A method according to claim 1, wherein said MTPR waveform includes a plurality of discrete tones having equal spectral spacings therebetween, and being fractional subharmonics of said pilot tone, and containing spectral notches at selected locations among said plurality of discrete tones.

4. A method according to claim 3, wherein said MTPR is determined in accordance with an average of ratios between noise floor energy associated with plural one of said spectral notches and energy of discrete tones adjacent to said plural ones of said spectral notches.

5. A method according to claim 3, wherein step (b) includes recovering said plurality of discrete tones of said MTPR waveform by fast Fourier transform (FFT) signal processing.

6. A method according to claim 5, wherein step (c) includes determining the impedance of said metallic wireline communication channel in accordance with said FFT signal processing.

7. A method according to claim 5, wherein step (c) includes determining the frequency response of said metallic wireline communication channel based on said FFT signal processing.

8. A method according to claim 1, wherein said metallic wireline communication channel comprises a plurality of metallic wireline links, and wherein step (a) comprises transmitting said pilot tone and said MTPR waveform over each of said metallic wireline links, step (b) comprises receiving said pilot tone transmitted over said metallic wireline links and processing said pilot tone to derive reference tone signals, and detecting said MTPR waveforms transmitted over said metallic wireline links using said reference to signals, and step (c) comprises determining respective MTPRs for the MTPR waveforms detected in step (b) and generating respective figures of merit for said metallic wireline links in accordance with said MTPRs.

9. A method according to claim 8, further including the step (d) of selecting one of said communication channels for conducting communications by way of a given communication device, in accordance with a prescribed relationship between said figures of merit and said performance data associated with said given communication device.

10. A method according to claim 9, wherein said plurality of metallic wireline links comprise metallic line pairs of a common communication cable, and step (d) comprises selecting one of said metallic line pairs of said common communication cable for conducting communications by way of said given communication device.

11. A system for measuring performance of a metallic wireline communication channel comprising:
 a transmitter operative to transmit a pilot tone and a multi-tone power ratio (MTPR) waveform over said metallic wireline communication channel;
 a receiver operatively connected to said communication channel and operative to recover said MTPR waveform from said metallic wireline communication channel using said pilot tone as a reference tone signal; and
 a signal processor operatively connected to said receiver and operative to process said MTPR waveform recovered by said receiver, determine the MTPR, and to generate a figure of merit representative of at least one of the frequency response and impedance of said metallic wireline communication channel based on the MTPR.

12. A system according to claim 11, wherein said MTPR waveform comprises a plurality of discrete tones that are fractional subharmonics of said pilot tone, having equal spectral spacings therebetween, and containing spectral notches at selected locations among said plurality of discrete tones.

13. A system according to claim 12, wherein said signal processor is operative to determine MTPR in accordance with a ratio between noise floor energy associated with a spectral notch and energy of a discrete tone adjacent to said notch.

14. A system according to claim 12, wherein said signal processor is operative to determine MTPR in accordance with an average of ratios between noise floor energy associated with plural spectral notches and energy of discrete tones adjacent to said plural spectral notches.

15. A system according to claim 12, wherein said receiver is operative to recover said plurality of discrete tones of said MTPR waveform by fast Fourier transform (FFT) signal processing.

16. A system according to claim 15, wherein said signal processor is operative to determine said at least frequency response and impedance of said metallic wireline communication channel based on said FFT signal processing.

17. A test arrangement according to claim 11, wherein said metallic wireline communication channel comprises a communication cable containing multiple metallic wireline pairs.

* * * * *

UNITED STATES PATENT AND TRADEMARK OFFICE
CERTIFICATE OF CORRECTION

PATENT NO. : 6,263,048 B1
DATED : July 17, 2001
INVENTOR(S) : George Rodney Nelson, Richard D. Roberts, Ronald S. Squires It is certified that error appears in the above-identified patent and that said Letters Patent is hereby corrected as shown below:

Title page,
ABSTRACT, delete "To generated a figure" insert -- To generate a figure --

Column 1,
Line 25, delete "FIG. 11" insert -- FIG. 1 --
Line 66, delete "manufacture's" insert -- manufacturer's --

Column 2,
Line 61, delete "This test consist of a transmitting" insert -- This test consists of transmitting --

Column 7,
Line 19, delete "FIG. 4 15" insert -- FIG. 4 --

Column 8,
Line 40, delete "(PAL)" insert -- (PGA) --

Column 10,
Line 34, delete "gains levels" insert -- gain levels --

Signed and Sealed this

Twenty-ninth Day of January, 2002

*Attest:*

JAMES E. ROGAN
*Attesting Officer*    *Director of the United States Patent and Trademark Office*